(12) United States Patent
Taylor et al.

(10) Patent No.: US 9,798,915 B1
(45) Date of Patent: Oct. 24, 2017

(54) GROCERY INVENTORY TRACKING ASSEMBLY

(71) Applicants: William Taylor, Elm City, NC (US); Diane Taylor, Elm City, NC (US)

(72) Inventors: William Taylor, Elm City, NC (US); Diane Taylor, Elm City, NC (US)

( * ) Notice: Subject to any disclaimer, the term of this patent is extended or adjusted under 35 U.S.C. 154(b) by 0 days.

(21) Appl. No.: 15/096,718

(22) Filed: Apr. 12, 2016

(51) Int. Cl.
*G06K 7/10* (2006.01)
*G06K 19/06* (2006.01)
*G06K 19/07* (2006.01)
*G06K 19/073* (2006.01)

(52) U.S. Cl.
CPC ..... *G06K 7/10881* (2013.01); *G06K 7/10861* (2013.01); *G06K 19/06028* (2013.01); *G06K 19/0703* (2013.01); *G06K 19/07345* (2013.01)

(58) Field of Classification Search
CPC ........... G06K 7/10881; G06K 7/10861; G06K 19/06028; G06K 19/07345; G06K 19/0703
USPC .......................... 235/462.01, 462.41, 462.43
See application file for complete search history.

(56) References Cited

U.S. PATENT DOCUMENTS

| 6,065,728 | A | * | 5/2000 | Spradlin | ............ | G06K 7/10861 |
| | | | | | | 206/305 |
| 6,394,355 | B1 | * | 5/2002 | Schlieffers | ......... | G06K 7/10881 |
| | | | | | | 235/462.45 |
| 6,513,017 | B1 | | 1/2003 | Howard et al. | | |
| 7,292,146 | B1 | | 11/2007 | Nguyen et al. | | |
| 7,448,546 | B2 | | 11/2008 | Jung et al. | | |
| D582,406 | S | | 12/2008 | Montes | | |
| 7,873,547 | B2 | | 1/2011 | Borom et al. | | |
| 8,284,461 | B2 | | 10/2012 | Rusman et al. | | |
| 8,419,434 | B2 | | 4/2013 | Do et al. | | |
| 8,615,450 | B1 | | 12/2013 | Fanelli | | |
| 8,825,123 | B1 | * | 9/2014 | Gudino | .................. | A45C 11/00 |
| | | | | | | 348/333.01 |
| 2002/0104887 | A1 | * | 8/2002 | Schlieffers | ........... | G07G 1/0081 |
| | | | | | | 235/472.02 |
| 2012/0080465 | A1 | * | 4/2012 | Son | ......................... | B60R 11/02 |
| | | | | | | 224/276 |
| 2013/0126610 | A1 | * | 5/2013 | Aihara | .................. | G06Q 20/322 |
| | | | | | | 235/383 |
| 2014/0069973 | A1 | * | 3/2014 | Peck | ....................... | B60R 11/02 |
| | | | | | | 224/411 |
| 2014/0128132 | A1 | * | 5/2014 | Cox, III | ............... | H04B 1/3888 |
| | | | | | | 455/575.8 |
| 2014/0263939 | A1 | * | 9/2014 | Rinner | .................... | F16M 11/10 |
| | | | | | | 248/688 |
| 2015/0029352 | A1 | * | 1/2015 | Burciaga | .............. | H04N 5/2251 |
| | | | | | | 348/211.99 |
| 2015/0095189 | A1 | * | 4/2015 | Dharssi | ................ | G07G 1/0063 |
| | | | | | | 705/26.8 |

(Continued)

FOREIGN PATENT DOCUMENTS

WO     WO02080035     10/2002

*Primary Examiner* — Paultep Savusdiphol

(57) ABSTRACT

A grocery inventory tracking assembly includes a scanning unit has a scanner and an electronic memory. The scanner is electrically coupled to the electronic memory. The scanner may scan bar codes on grocery items. The electronic memory may store the bar codes thereby facilitating the electronic memory to track inventory of the grocery items. A mount is provided and the mount may be removably coupled to a support surface. The mount frictionally engages the scanning unit. Thus, the scanning unit may be retained on the support surface.

9 Claims, 3 Drawing Sheets

(56) References Cited

U.S. PATENT DOCUMENTS

| | | | | |
|---|---|---|---|---|
| 2015/0317503 A1* | 11/2015 | Powell | ............... | G06K 7/10831 |
| | | | | 235/455 |
| 2015/0356336 A1* | 12/2015 | Hoobler | ................ | G06K 7/089 |
| | | | | 235/455 |
| 2016/0072933 A1* | 3/2016 | Cox, III | ................ | H04M 1/185 |
| | | | | 455/575.8 |
| 2016/0249718 A1* | 9/2016 | Oh | ....................... | H04B 1/3888 |

* cited by examiner

GROCERY INVENTORY TRACKING ASSEMBLY

BACKGROUND OF THE DISCLOSURE

Field of the Disclosure

The disclosure relates to tracking devices and more particularly pertains to a new tracking device for tracking grocery inventory and compiling a shopping list.

SUMMARY OF THE DISCLOSURE

An embodiment of the disclosure meets the needs presented above by generally comprising a scanning unit has a scanner and an electronic memory. The scanner is electrically coupled to the electronic memory. The scanner may scan bar codes on grocery items. The electronic memory may store the bar codes thereby facilitating the electronic memory to track inventory of the grocery items. A mount is provided and the mount may be removably coupled to a support surface. The mount frictionally engages the scanning unit. Thus, the scanning unit is configured to be retained on the support surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
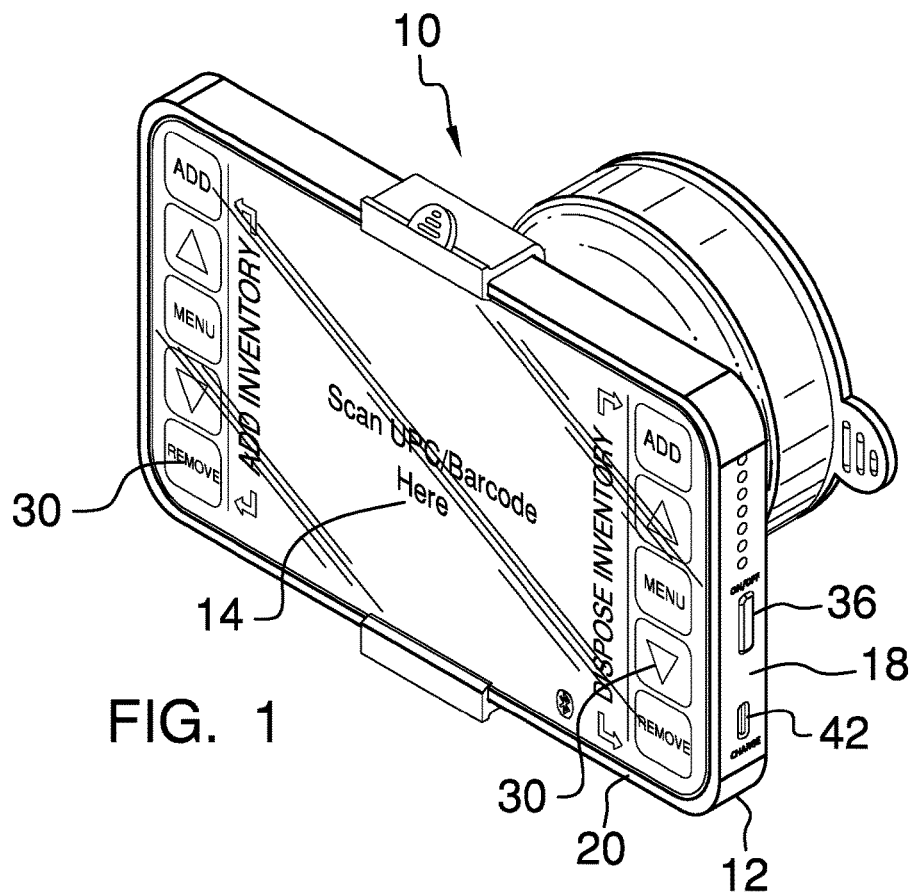
FIG. 1 is a front perspective view of a grocery inventory tracking assembly according to an embodiment of the disclosure.
Figure 2:
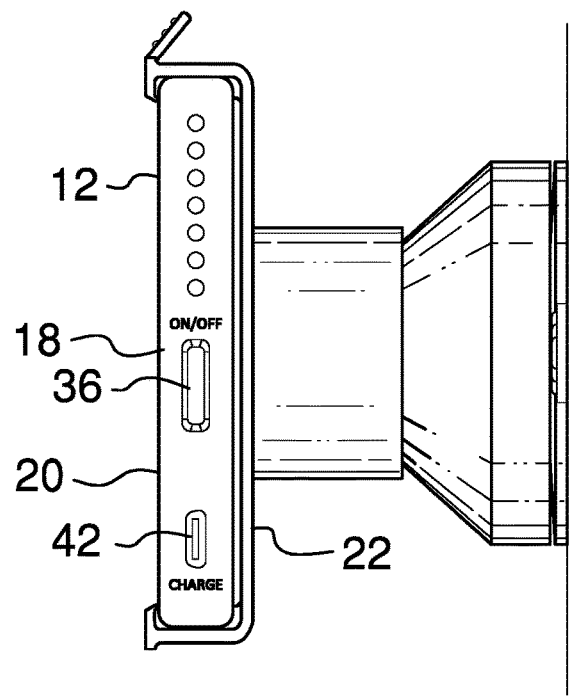
FIG. 2 is a right side view of an embodiment of the disclosure.
Figure 3:
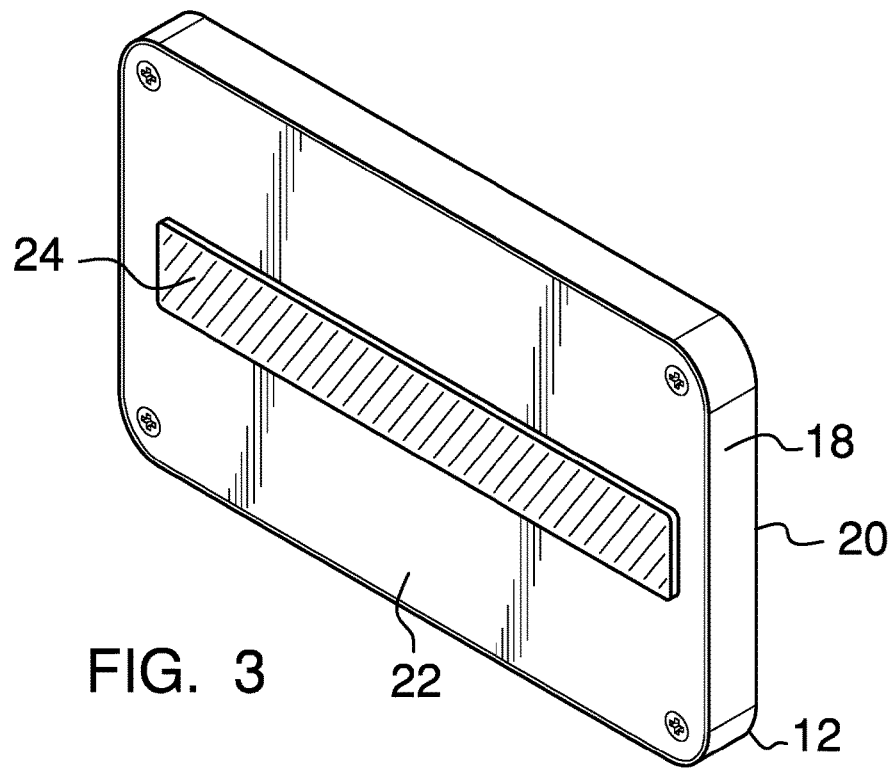
FIG. 3 is a back perspective view of an embodiment of the disclosure.
Figure 4:
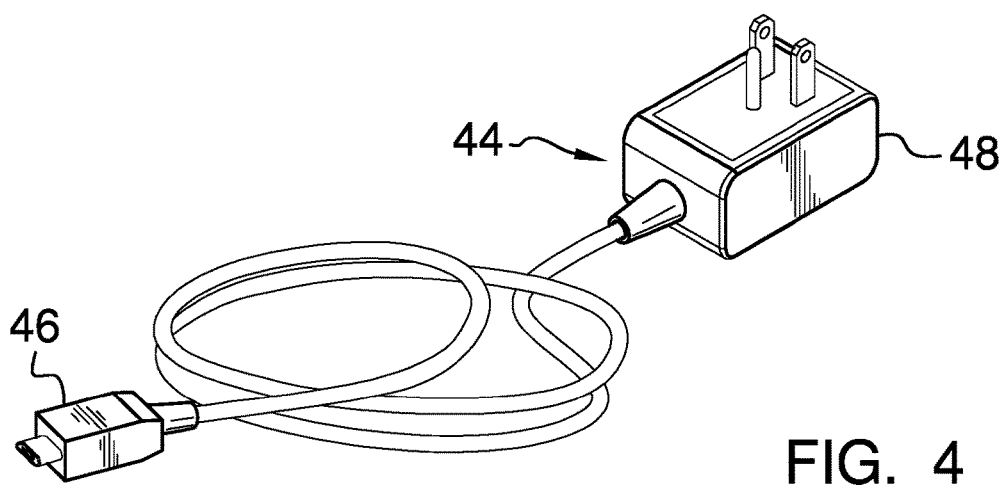
FIG. 4 is a perspective view of a charger of an embodiment of the disclosure.
Figure 5:
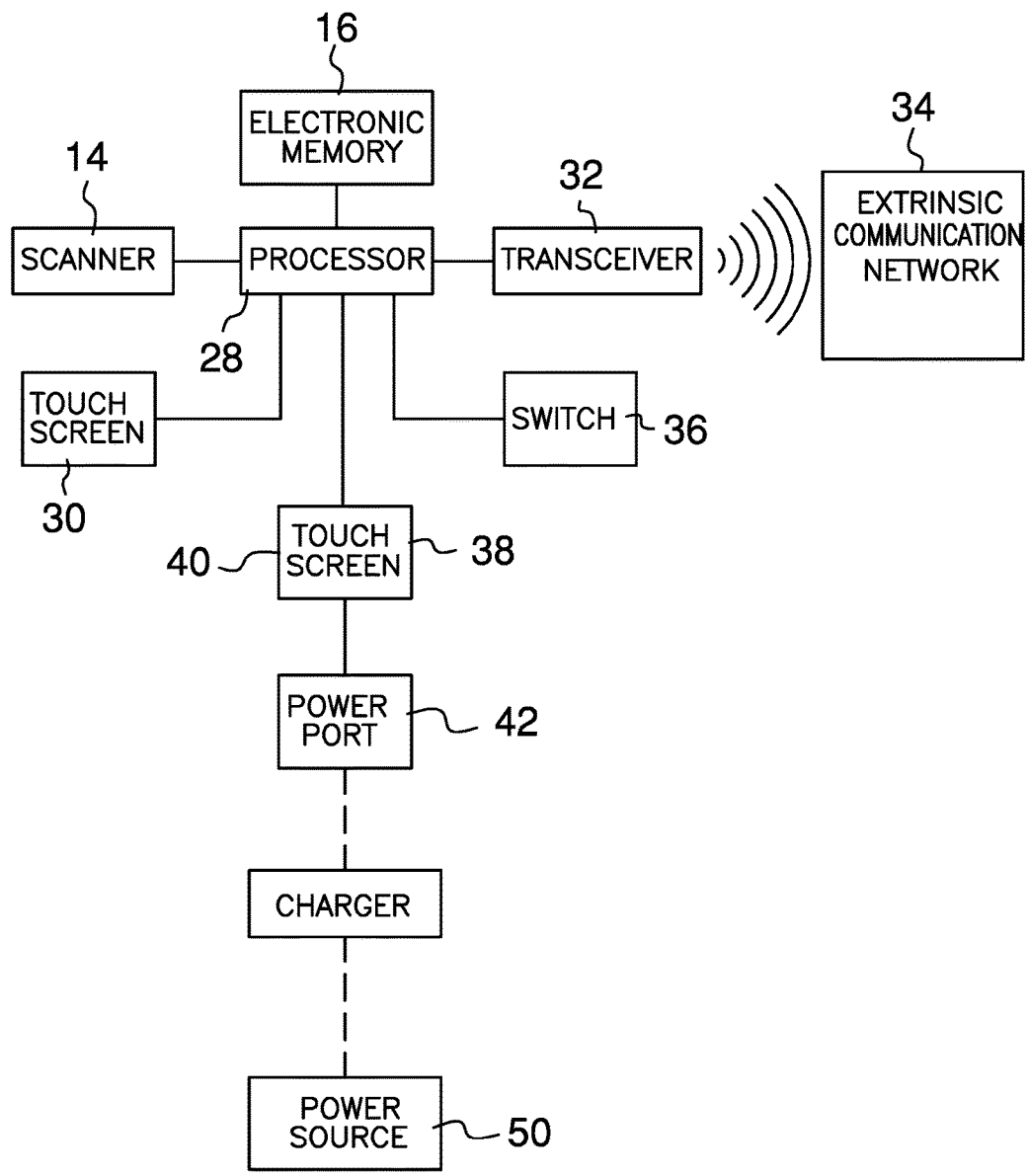
FIG. 5 is a schematic view of an embodiment of the disclosure.

With reference now to the drawings, and in particular to FIGS. 1 through 5 thereof, a new tracking device embodying the principles and concepts of an embodiment of the disclosure and generally designated by the reference numeral 10 will be described.

As best illustrated in FIGS. 1 through 5, the grocery inventory tracking assembly 10 generally comprises a scanning unit 12 that has a scanner 14 and an electronic memory 16. The scanner 14 is electrically coupled to the electronic memory 16. The scanner 14 may scan bar codes on grocery items. The scanner 14 may comprise an infrared scanner or the like. The electronic memory 16 stores the bar codes thereby facilitating the electronic memory 16 to track inventory of the grocery items. The electronic memory 16 may comprise RAM memory or the like.

The scanning unit 12 comprises a housing 18 that may be manipulated. The housing 18 has a front wall 20 and a back wall 22. The scanner 14 is coupled to the front wall 20 and the electronic memory 16 is coupled to the housing 18. A magnet 24 is coupled to the back wall 22. The magnet 24 may magnetically engage a magnetic support surface 26 thereby coupling the housing to the magnetic support surface 26. The magnetic support surface 26 may comprise a refrigerator or the like.

A processor 28 is coupled to the housing 18 and the processor 28 is electrically coupled to the scanner 14 and the electronic memory 16. A touch screen 30 is coupled to the front wall 20 of the housing 18 and the touch screen 30 may be manipulated. The touch screen 30 is electrically coupled to the processor 28. Thus, the touch screen 30 controls operational parameters of the scanner 14 and the electronic memory 16.

A transceiver 32 is coupled to the housing 18 and the transceiver 32 is electrically coupled to the processor 28. The transceiver 32 may be in electrical communication with an extrinsic communications network 34. Thus, the transceiver 32 may receive electronic coupons relating to the grocery items. The extrinsic communications network 34 may comprise the internet. A switch 36 is coupled to the housing 18 and the switch 36 may be manipulated. The switch 36 is electrically coupled to the processor 28 such that the switch 36 turns the processor 28 on and off.

A power supply 38 is coupled to the housing 18 and the power supply 38 is electrically coupled to the processor 28. The power supply 38 comprises at least one battery 40. The power supply 38 further comprises a charge port 42 that is coupled to the housing 18. The charge port 42 is electrically coupled to the at least one battery 40.

A charger 44 is provided. The charger 44 has a first plug 46 and a second plug 48. The first plug 46 is selectively electrically coupled to the charge port 42. The second plug 48 may be electrically coupled to a power source 50. Thus, the charger 44 may charge the at least one battery 40. The power source 50 may comprise an electrical outlet or the like.

A mount 52 is provided and the mount 52 may be removably coupled to a support surface 54. The mount 52 frictionally engages the scanning unit 12. Thus, the scanning unit 12 may be retained on the support surface 54. The mount 52 comprises a central member 56 extending between a pair of end members 58. Each of the end members 58 is oriented perpendicular to the central member 56. The end members 58 are spaced apart from each other. Each of the end members 58 frictionally engages the housing 18 having the central member 56 abutting the back wall 22.

A coupler 60 is coupled to the central member 56. The coupler 60 includes a stem 62 and a cup 64. The stem 62 extends away from the central member 56 and the stem 62 is oppositionally positioned with respect to the end members 58. The cup 64 has a distal surface 66 with respect to the central member 56. The distal surface 66 is concavely arcuate. Thus, the distal surface 66 may suctionally engage the support surface 54 thereby retaining the mount 52 on the support surface 54.

In use, the scanning unit 12 is carried while grocery shopping. The scanner 14 scans each grocery item. The touch screen 30 is manipulated to add the grocery item to the inventory. The mount 52 is coupled to the support surface 54. The mount 52 may be positioned proximate a garbage can or the like. The scanning unit 12 is coupled to the mount 52 after grocery shopping is complete. The scanner 14 scans the grocery item when the grocery item is being thrown away. The touch screen 30 is manipulated to remove the grocery item from the inventory.

The grocery items that are removed from the inventory are compiled into a shopping list. Thus, the grocery items in the shopping list are purchased on the next grocery shopping trip. The electronic memory 16 may compile the cost of each grocery item during grocery shopping. The transceiver 32 receives the electronic coupons and the electronic coupons are subtracted from the cost of the grocery items. Thus, the electronic memory 16 may compile a total expected cost during grocery shopping.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A grocery inventory tracking assembly comprising:
   a scanning unit having a scanner and an electronic memory, said scanner being electrically coupled to said electronic memory, said scanner being configured to scan bar codes on grocery items, said electronic memory being configured to store the bar codes thereby facilitating said electronic memory to track inventory of the grocery items, wherein said scanning unit comprises:
     a housing being configured to be manipulated, said housing having a front wall and a back wall, said scanner being coupled to said front wall, and
     a processor being coupled to said housing, said processor being electrically coupled to said scanner and said electronic memory, said electronic memory being coupled to said housing;
   a mount being configured to be removably coupled to a support surface, said mount frictionally engaging said scanning unit wherein said scanning unit is configured to be retained on the support surface; and
   a magnet being coupled directly to said back wall, said magnet being configured to magnetically engage a magnetic support surface thereby coupling said housing to the magnetic support surface.

2. The assembly according to claim 1, further comprising a touch screen being coupled to said front wall wherein said touch screen is configured to be manipulated, said touch screen being electrically coupled to said processor wherein said touch screen controls operational parameters of said scanner and said electronic memory.

3. The assembly according to claim 1, further comprising a transceiver being coupled to said housing, said transceiver being electrically coupled to said processor, said transceiver being configured to be in electrical communication with an extrinsic communications network thereby facilitating said transceiver to receive electronic coupons relating to the grocery items.

4. The assembly according to claim 1, further comprising a switch being coupled to said housing wherein said switch is configured to be manipulated, said switch being electrically coupled to said processor such that said switch turns said processor on and off.

5. The assembly according to claim 1, further comprising a power supply being coupled to said housing, said power supply being electrically coupled to said processor, said power supply comprising at least one battery, said power supply further comprising a charge port being coupled to said housing, said charge port being electrically coupled to said at least one battery.

6. The assembly according to claim 5, further comprising a charger having a first plug and a second plug, said first plug being selectively electrically coupled to said charge port, said second plug being configured to be electrically coupled to a power source thereby facilitating said charger to charge said at least one battery.

7. The assembly according to claim 1, wherein:
   said housing has a back wall; and
   said mount comprises a central member extending between a pair of end members, each of said end members being oriented perpendicular to said central member, said end members being spaced apart from each other, each of said end members frictionally engaging said housing having said central member abutting said back wall.

8. The assembly according to claim 7, further comprising a coupler being coupled to said central member, said coupler including a stem and a cup, said stem extending away from said central member, said cup having a distal surface with respect to said central member, said distal surface being concavely arcuate wherein said distal surface is configured to suctionally engage the support surface thereby retaining said mount on the support surface.

9. A grocery inventory tracking assembly comprising:
   a scanning unit having a scanner and an electronic memory, said scanner being electrically coupled to said electronic memory, said scanner being configured to scan bar codes on grocery items, said electronic memory being configured to store the bar codes thereby facilitating said electronic memory to track inventory of the grocery items, said scanning unit comprising:
     a housing being configured to be manipulated, said housing having a front wall and a back wall, said scanner being coupled to said front wall,
     a magnet being coupled directly to said back wall of said housing, said magnet being configured to magnetically engage a magnetic support surface thereby coupling said housing to the magnetic support surface,
     a processor being coupled to said housing, said processor being electrically coupled to said scanner and said electronic memory, said electronic memory being coupled to said housing, a touch screen being coupled to said front wall wherein said touch screen is configured to be manipulated, said touch screen being electrically coupled to said processor wherein said touch screen controls operational parameters of said scanner and said electronic memory, a transceiver being coupled to said housing, said transceiver being electrically coupled to said processor, said transceiver being configured to be in electrical communication with an extrinsic communications network thereby facilitating said transceiver to receive electronic coupons relating to the grocery items, a switch being coupled to said housing wherein said switch is configured to be manipulated, said switch being electrically coupled to said processor such that said switch turns said processor on and off, and a power supply being coupled to said housing, said power supply being electrically coupled to said processor, said power supply comprising at least one battery, said power supply further comprising a charge port being coupled to said housing, said charge port being electrically coupled to said at least one battery;

a mount being configured to be removably coupled to said support surface, said mount frictionally engaging said scanning unit wherein said scanning unit is configured to be retained on the support surface, said mount comprising:
  a central member extending between a pair of end members, each of said end members being oriented perpendicular to said central member, said end members being spaced apart from each other, each of said end members frictionally engaging said housing having said central member abutting said back wall, and
  a coupler being coupled to said central member, said coupler including a stem and a cup, said stem extending away from said central member, said cup having a distal surface with respect to said central member, said distal surface being concavely arcuate wherein said distal surface is configured to suctionally engage the support surface thereby retaining said mount on the support surface; and a charger having a first plug and a second plug, said first plug being selectively electrically coupled to said charge port, said second plug being configured to be electrically coupled to a power source thereby facilitating said charger to charge said at least one battery.

* * * * *